(12) United States Patent (10) Patent No.: US 12,687,897 B2
Yuan et al. (45) Date of Patent: Jul. 21, 2026

(54) ROTATION STRUCTURE AND ELECTRONIC DEVICE

(71) Applicant: Lenovo (Beijing) Limited, Beijing (CN)

(72) Inventors: Chunfeng Yuan, Beijing (CN); Yingce Zheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 272 days.

(21) Appl. No.: 18/352,688

(22) Filed: Jul. 14, 2023

(65) Prior Publication Data

US 2024/0019910 A1 Jan. 18, 2024

(30) Foreign Application Priority Data

Jul. 15, 2022 (CN) .......................... 202210839801.1

(51) Int. Cl.
| | |
|---|---|
| *G06F 1/16* | (2006.01) |
| *F16C 11/04* | (2006.01) |
| *E05D 3/12* | (2006.01) |
| *E05D 11/06* | (2006.01) |
| *E05D 11/10* | (2006.01) |

(52) U.S. Cl.
CPC ............ *G06F 1/1681* (2013.01); *F16C 11/04* (2013.01); *E05D 3/12* (2013.01); *E05D 11/06* (2013.01); *E05D 11/1078* (2013.01); *E05Y 2201/218* (2013.01); *E05Y 2201/224* (2013.01); *E05Y 2999/00* (2024.05)

(58) Field of Classification Search
CPC ........ G06F 1/1681; F16C 11/04; F16C 11/10; E05D 3/12; E05D 11/06; E05D 11/1078; E05Y 2201/218; E05Y 2201/224; E05Y 2999/00; H04M 1/022

See application file for complete search history.

(56) References Cited

U.S. PATENT DOCUMENTS

| | | | | |
|---|---|---|---|---|
| 8,914,946 B2 * | 12/2014 | Hsu | ........................ | G06F 1/1681 |
| | | | | 16/342 |
| 9,003,607 B1 * | 4/2015 | Hsu | ........................ | G06F 1/1618 |
| | | | | 16/366 |
| 9,104,381 B2 * | 8/2015 | Kuramochi | ........... | G06F 1/1681 |
| 9,134,767 B2 * | 9/2015 | Chen | ..................... | G06F 1/1681 |
| 9,342,101 B2 * | 5/2016 | Hsu | ........................ | G06F 1/1679 |
| 9,417,663 B2 * | 8/2016 | Kinoshita | ............. | G06F 1/1618 |

(Continued)

*Primary Examiner* — Imani N Hayman
*Assistant Examiner* — Theron S Milliser
(74) *Attorney, Agent, or Firm* — ANOVA LAW GROUP, PLLC

(57) ABSTRACT

A rotation structure includes a first rotating shaft assembly, a second rotating shaft assembly, and a stopper. The first rotating shaft assembly includes a first shaft and a first wheel, a first groove being arranged on the first wheel. The second rotating shaft assembly includes a second shaft and a second wheel, the second shaft and the first shaft satisfying a parallel condition, a second groove being arranged on the second wheel. A first protrusion and a second protrusion are arranged on the stopper, the first protrusion being limited to move in the first groove, the second protrusion being limited to move in the second groove, and the limit of the first groove to the first protrusion and the limit of the second groove to the second protrusion allow one of the first shaft and the second shaft to rotate.

15 Claims, 13 Drawing Sheets

(56) References Cited

U.S. PATENT DOCUMENTS

| 9,600,036 | B2 * | 3/2017 | Uchiyama | G06F 1/1618 |
| 9,727,093 | B2 * | 8/2017 | Chuang | H04M 1/02 |
| 9,791,895 | B2 * | 10/2017 | Hsu | G06F 1/1681 |
| 10,253,804 | B2 * | 4/2019 | Park | E05D 3/06 |
| 10,364,598 | B2 * | 7/2019 | Tazbaz | E05D 11/1007 |
| 10,385,914 | B2 * | 8/2019 | Chuang | E05D 3/06 |
| 10,474,203 | B2 * | 11/2019 | Tazbaz | G06F 1/1681 |
| 10,480,226 | B1 * | 11/2019 | Chen | E05D 3/122 |
| 10,520,986 | B2 * | 12/2019 | Hsu | G06F 1/1681 |
| 10,571,975 | B2 * | 2/2020 | Uchiyama | G06F 1/1681 |
| 11,366,498 | B2 * | 6/2022 | Shibayama | G06F 1/1616 |
| 11,662,769 | B2 * | 5/2023 | Lin | H04M 1/0235 361/679.27 |
| 2012/0137471 | A1 * | 6/2012 | Kujala | G06F 1/1681 16/382 |
| 2013/0318746 | A1 * | 12/2013 | Kuramochi | G06F 1/1681 16/371 |
| 2014/0338483 | A1 * | 11/2014 | Hsu | H04M 1/022 74/96 |
| 2014/0360296 | A1 * | 12/2014 | Hsu | G06F 1/1679 74/98 |
| 2014/0362507 | A1 * | 12/2014 | Kinoshita | G06F 1/1681 16/374 |
| 2015/0040353 | A1 * | 2/2015 | Chen | G06F 1/1681 16/366 |
| 2016/0083988 | A1 * | 3/2016 | Hsu | G06F 1/1681 361/679.01 |
| 2016/0259379 | A1 * | 9/2016 | Uchiyama | G06F 1/1681 |
| 2016/0266615 | A1 * | 9/2016 | Uchiyama | G06F 1/1681 |
| 2017/0131743 | A1 * | 5/2017 | Chuang | G06F 1/1681 |
| 2018/0059735 | A1 * | 3/2018 | Tazbaz | G06F 1/1677 |
| 2018/0066465 | A1 * | 3/2018 | Tazbaz | G06F 1/1681 |
| 2018/0209473 | A1 * | 7/2018 | Park | G06F 1/1618 |
| 2018/0363695 | A1 * | 12/2018 | Chuang | E05D 3/06 |
| 2020/0033917 | A1 * | 1/2020 | Tazbaz | G06F 1/1677 |
| 2021/0064084 | A1 * | 3/2021 | Lin | G06F 1/1681 |
| 2021/0232183 | A1 * | 7/2021 | Shibayama | G06F 1/1681 |
| 2023/0350468 | A1 * | 11/2023 | Yang | G06F 1/1681 |

* cited by examiner

2213

30

1212

1211

40

20

30

10

ROTATION STRUCTURE AND ELECTRONIC DEVICE

CROSS-REFERENCES TO RELATED APPLICATION

This application claims priority to Chinese Patent Application No. 202210839801.1 filed on Jul. 15, 2022, the entire content of which is incorporated herein by reference.

FIELD OF TECHNOLOGY

The present disclosure relates to a rotation structure and an electronic device.

BACKGROUND

Many electronic devices use the dual-axis rotation structure. The dual-axis rotation structure can generally be divided into synchronous dual-axis, asynchronous dual-axis, and hybrid dual-axis. The core of the asynchronous dual-axis is to realize the alternate locking and rotation of the two shafts through a set of switching mechanisms, and most asynchronous dual-axis switching mechanisms adopt the cam-slider structure. However, in the cam-slider structure, the slider needs to make a radial displacement to achieve the climb and fall of the crescent position, and the climb and fall of the crescent position will cause a stop-and-go feeling when switching, which affect the user experience.

SUMMARY

Embodiments of the present disclosure provide a rotation structure. The rotation structure includes a first rotating shaft assembly, a second rotating shaft assembly, and a stopper. The first rotating shaft assembly includes a first shaft and a first wheel arranged on the first shaft, and a first groove is arranged on the first wheel. The second rotating shaft assembly includes a second shaft and a second wheel arranged on the second shaft, and the second shaft and the first shaft satisfy a parallel condition. A second groove is arranged on the second wheel. A first protrusion and a second protrusion are arranged on the stopper, the first protrusion being limited to move in the first groove, the second protrusion being limited to move in the second groove. The limit of the first groove to the first protrusion and the limit of the second groove to the second protrusion allow one of the first shaft and the second shaft to rotate.

Embodiments of the present disclosure provide an electronic device. The electronic device includes a first body, a second body, and a rotation structure connecting the first body and the second body for the first body and the second body to open and close mutually. The rotation structure includes a first rotating shaft assembly, a second rotating shaft assembly, and a stopper. The first rotating shaft assembly includes a first shaft and a first wheel arranged on the first shaft, and a first groove is arranged on the first wheel. The second rotating shaft assembly includes a second shaft and a second wheel arranged on the second shaft, and the second shaft and the first shaft satisfy a parallel condition. A second groove is arranged on the second wheel. A first protrusion and a second protrusion are arranged on the stopper, the first protrusion being limited to move in the first groove, the second protrusion being limited to move in the second groove. The limit of the first groove to the first protrusion and the limit of the second groove to the second protrusion allow one of the first shaft and the second shaft to rotate.

BRIEF DESCRIPTION OF THE DRAWINGS

The following drawings are incorporated herein as a part of the present disclosure. The accompanying drawings illustrate certain embodiment(s) of the present disclosure, which explains the principles of the present disclosure.

REFERENCE NUMERALS IN THE DRAWINGS

Figure 1:
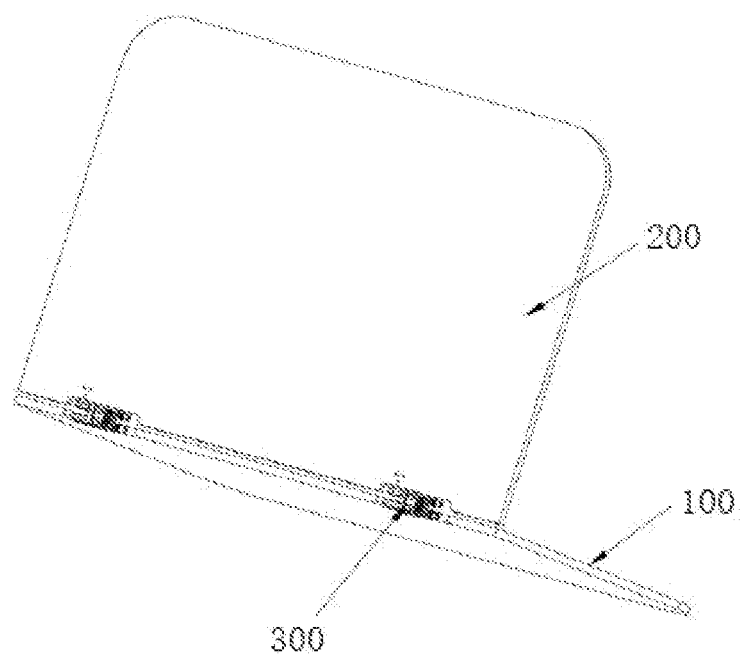
FIG. 1 is a structural diagram of an electronic device according to an embodiment of the present disclosure.

100 First body
200 Second body

300 Rotation structure
10 First rotating shaft assembly
11 First shaft
12 First wheel
121 First groove
1211 First linear groove segment
1212 First spiral groove segment
1213 First circumferential groove segment
1214 Second circumferential groove segment
13 First connector
20 Second rotating shaft assembly
21 Second shaft
22 Second wheel
221 Second groove
2211 Second spiral groove segment
2212 Second linear groove segment
2213 Third spiral groove segment
2214 Fourth spiral groove segment
2215 Fifth spiral groove segment
23 Second connector
30 Stopper
301 First end
302 Second end
31 First protrusion
32 Second protrusion
33 First arc-shaped groove
34 Second arc-shaped groove
35 Guide
40 Holding assembly
401 First installation part
402 Second installation part
403 Guide space
41 First holding part
411 First holding body
4111 First piercing part
4112 Third piercing part
412 First extension
413 Second extension
42 Second holding part
421 Second holding body
4211 Second piercing part
4212 Fourth piercing part
422 Extension
50 Torsion assembly
51 First torsion structure
511 First torsion spring
512 First nut
52 Second torsion structure
521 Second torsion spring
522 Second nut

DETAILED DESCRIPTION

In the following description, details are provided in order to enable a thorough understanding of the present disclosure. It will be appreciated by those skilled in the art, however, that the following description is merely illustrative of alternative embodiments of the present disclosure and that the present disclosure may be practiced without one or more of these details. Also, some technical features known in the art are not detailed herein to avoid confusion with the present disclosure.

The rotation structure and electronic device described in the embodiments of the present disclosure will be described in detail below with reference to FIGS. 1-22.

Referring to FIG. 1, the electronic device includes a first body 100, a second body 200, and a rotation structure 300.

The first body 100 and the second body 200 are connected by the rotation structure 300. The rotation structure 300 may be used to connect the first body 100 and the second body 200, and may be used to realize the mutual opening and closing between the first body 100 and the second body 200.

In the embodiments of the present disclosure, the structure of the electronic device is not limited. For example, an electronic device may be an all-in-one computer, a TV, or a notebook computer.

In the embodiments of the present disclosure, the structure of the first body 100 is not limited. For example, the first body 100 may be a block or a plate. In another example, the first body 100 may be a support structure with a seat. Based on the setting of the seat, the first body 100 may be used to place the electronic device on a supporting surface, which can be a desktop or the ground. In the embodiments of the present disclosure, the structure of the second body 200 is not limited. For example, the second body 200 may be a block or a plate.

The following description takes the electronic device as a notebook computer as an example to describe the rotation structure 300 in detail. It should be understood that, for electronic devices such as all-in-one computers and TVs, the rotation principle of the rotation structure 300 is the same as the rotation principle of a notebook computer, so details will not be repeated here.

As an example, as shown in FIG. 1, the first body 100 is the keyboard end of the notebook computer, and the second body 200 is the screen end of the notebook computer. Through the rotation structure 300, the electronic device can be opened and closed between the buckled state and the fully-opened state. That is, the screen end and the keyboard end can be opened and closed between 0° to 360°, and can be stably stopped at any opening and closing angle.

Referring to FIGS. 1-7, in some embodiments, the rotation structure 300 may include a first shaft assembly 10, a second shaft assembly 20, a stopper 30, a holding assembly 40, and a torsion assembly 50.

The first rotating shaft assembly 10 includes a first shaft 11 and a first wheel 12 arranged on the first shaft 11. The first wheel is arranged on a first groove 121 to conveniently connect with the first body 100. One end of the first shaft 11 is connected with a first connector 13, and the first connector 13 may be used to realize the connection between the first shaft 11 and the first body 100. The second rotating shaft assembly 20 includes a second shaft 21 and a second wheel 22 arranged on the second shaft 21. The second shaft 21 and the first shaft 11 may be arranged side by side at intervals, and the second shaft 21 and the first shaft 11 may be arranged to meet a parallel condition. The parallel condition here may be that the second shaft 21 and the first shaft 11 are parallel to each other within a tolerance range, and the arrangement state can be maintained by the holding assembly 40 and the torsion assembly 50. A second groove 221 may be arranged on the second wheel 22 to conveniently connect with the second body 200. One end of the second shaft 21 is also connected with a second connector 23. The second shaft 21 may be fixedly connected with the second body 200 through the second connector 23. Both the first shaft 11 and the second shaft 21 may rotate around their own axes. Asynchronous rotation can be realized through the mutual cooperation between the first wheel 12, the second wheel 22, and the stopper 30 (asynchronous rotation means that when one of the first shaft 11 and the second shaft 21 rotates, the other is locked), such that when the rotation structure 300 is applied to a notebook computer, the screen end and the keyboard end of the notebook computer can be opened and closed between 0° to 360°, and can stay at any opening and closing angle stably. The two ends of the torsion assembly 50 may be respectively connected to the first shaft 11 and the second shaft 21. Through the torsion assembly 50, the rotation structure 300 may stay at any opening and closing angle within the range of opening and closing angles, and stably maintain the stopped state.

Figure 2:
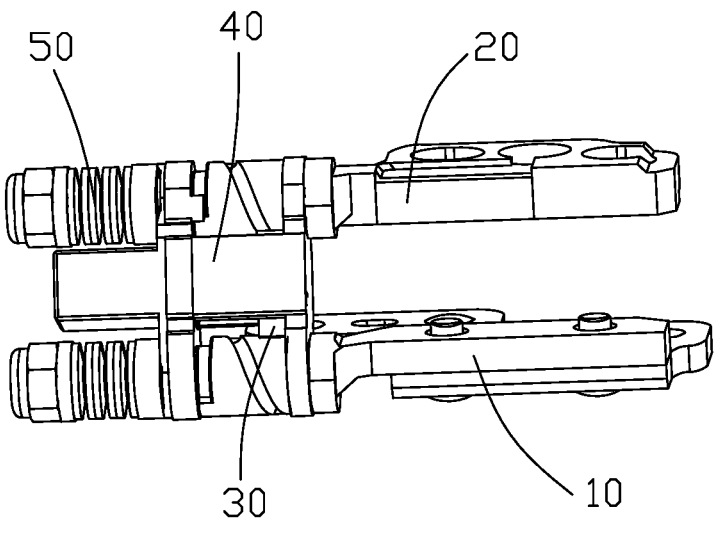
FIG. 2 is a first schematic diagram of a rotation structure according to an embodiment of the present disclosure.
Figure 4:
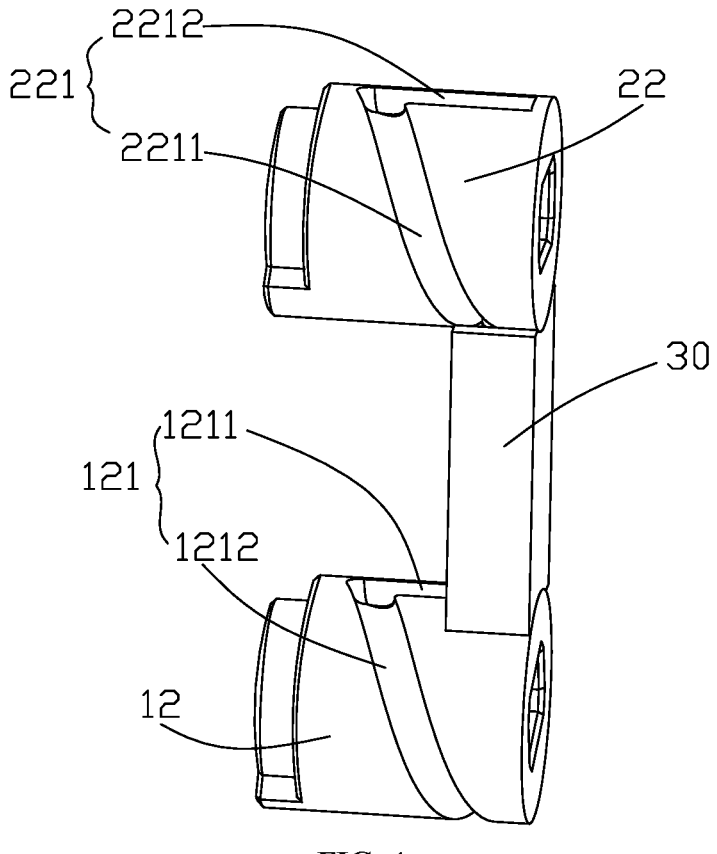
FIG. 4 is a connection structure diagram of a first wheel, a second wheel, and a stopper in FIG. 3.
Figure 5:
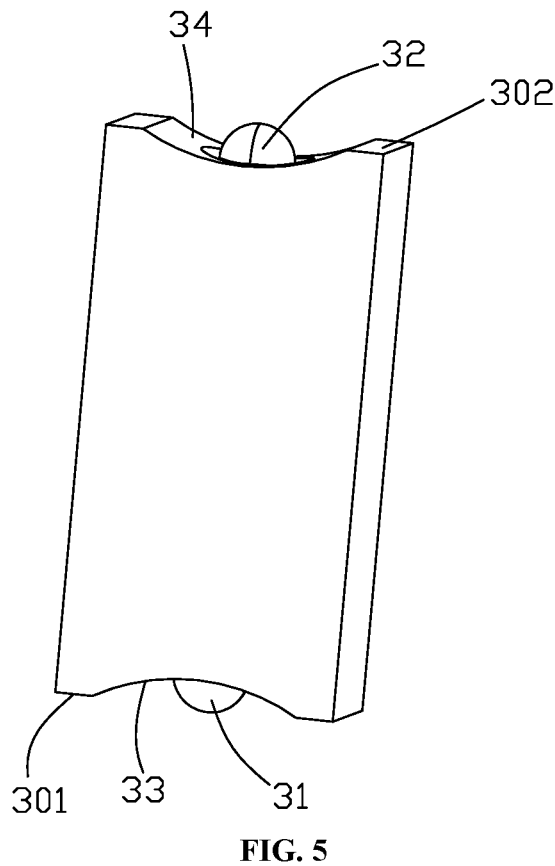
FIG. 5 is a structural diagram of the stopper in FIG. 2.

Referring to FIG. 2, FIG. 4, and FIG. 5, the stopper 30 includes a first protrusion 31 and a second protrusion 32. The first protrusion 31 may be a columnar structure or a block structure, and the first protrusion 31 may be limited to move in the first groove 121. The second protrusion 32 may be a columnar structure or a block structure, and the second protrusion 32 may be limited to move in the second groove 221. The first groove 121 can limit the first protrusion 31 and the second groove 221 can limit the second protrusion 32, such that one of the first shaft 11 and the second shaft 21 can rotate. That is, the rotation structure 300 can be at least in a first rotation mode. In the first rotation mode, one of the first shaft 11 and the first wheel 12 can rotate. That is, based on the limiting of the first protrusion 31 by the first groove 121 and the limiting of the second shaft 21 by the second groove 221, the first shaft 11 and the second shaft 21 can rotate asynchronously.

More specifically, in order to limit the movement of the first protrusion 31 in the first groove 121 and the movement of the second protrusion 32 in the second groove 221, the stopper 30 may include a first end 301 and an oppositely arranged second end 302. The stopper 30 may include a first arc-shaped groove 33 on the first end 301 and a second arc-shaped groove 34 on the second end 302. At least part of the first wheel 12 may be accommodated in the first arc-shaped groove 33, at least part of the second wheel 22 may be accommodated in the second arc-shaped groove 34, the first protrusion 31 may be disposed on the first arc-shaped groove 33, and the second protrusion 32 may be disposed on the second arc-shaped groove 34. In this way, not only can the movement of the first protrusion 31 be limited within the first groove 121, and the movement of the second protrusion 32 can be limited within the second groove 221 conveniently, but the stopper 30 can also be prevented from interfering with the first wheel 12 and/or the second wheel 22 during the movement.

Figure 8:
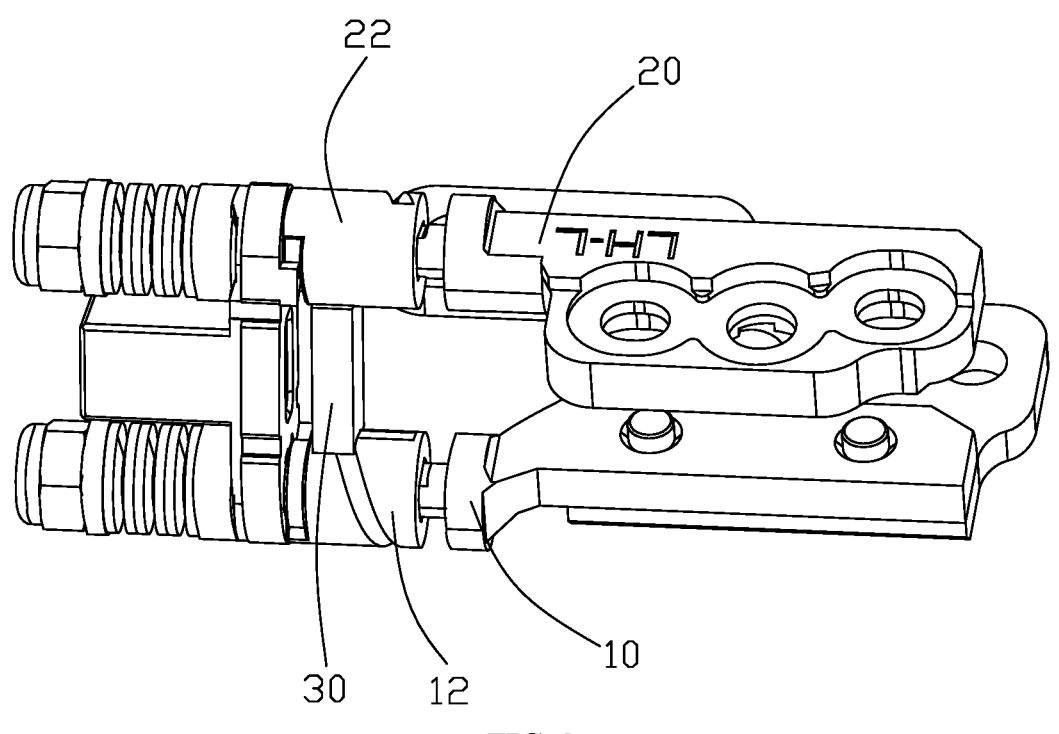
FIG. 8 is a second schematic diagram of the rotation structure according to an embodiment of the present disclosure.

As shown in FIG. 4, the first groove 121 includes a first linear groove segment 1211, and the second groove 221 includes a second spiral groove segment 2211 corresponding to the first linear groove segment 1211. When the first protrusion 31 is limited to move in the first linear groove segment 1211, the second protrusion 32 may be limited to move in the second spiral groove segment 2211, such that the stopper 30 moves from a first position (as shown in FIG. 2, the stopper 30 is in the first position at this time) to a second position (as shown in FIG. 8, the stopper 30 is in the second position at this time) along a first direction. In the second position, asynchronous rotation can be performed such that the first shaft 11 can be rotated and the second shaft 21 can be locked. In some embodiments, the first direction may meet the parallel condition with the first shaft 11 or the second shaft 21. In this way, through the cooperation of the first linear groove segment 1211 and the second spiral groove segment 2211 on the stopper 30, the asynchronous rotation of the rotation structure 300 can be realized.

Further, the first groove 121 includes a first spiral groove segment 1212 communicating with the first linear groove segment 1211, and the second groove 221 includes a second linear groove segment 2212 communicating with the second spiral groove segment 2211. When the first protrusion 31 is limited to move in the first spiral groove segment 1212, the second protrusion 32 may be limited to move in the second linear groove segment 2212, such that the stopper 30 moves from the second position to the first position along the first direction. In the first position, asynchronous rotation can be performed such that the first shaft 11 can be locked and the second shaft 21 can be rotated. In this way, through the cooperation of the first spiral groove segment 1212 and the second linear groove segment 2212 on the stopper 30, the asynchronous movement of the rotation structure 300 can also be realized. In addition, the cooperation of the first linear groove segment 1211 and the second spiral groove segment 2211 on the stopper 30 and the cooperation of the first spiral groove segment 1212 and the second linear groove segment 2212 on the stopper 30 can be combined to realize the switching of the asynchronous movement mode of the rotation structure 300. The specific switching process will be described later.

Figure 6:
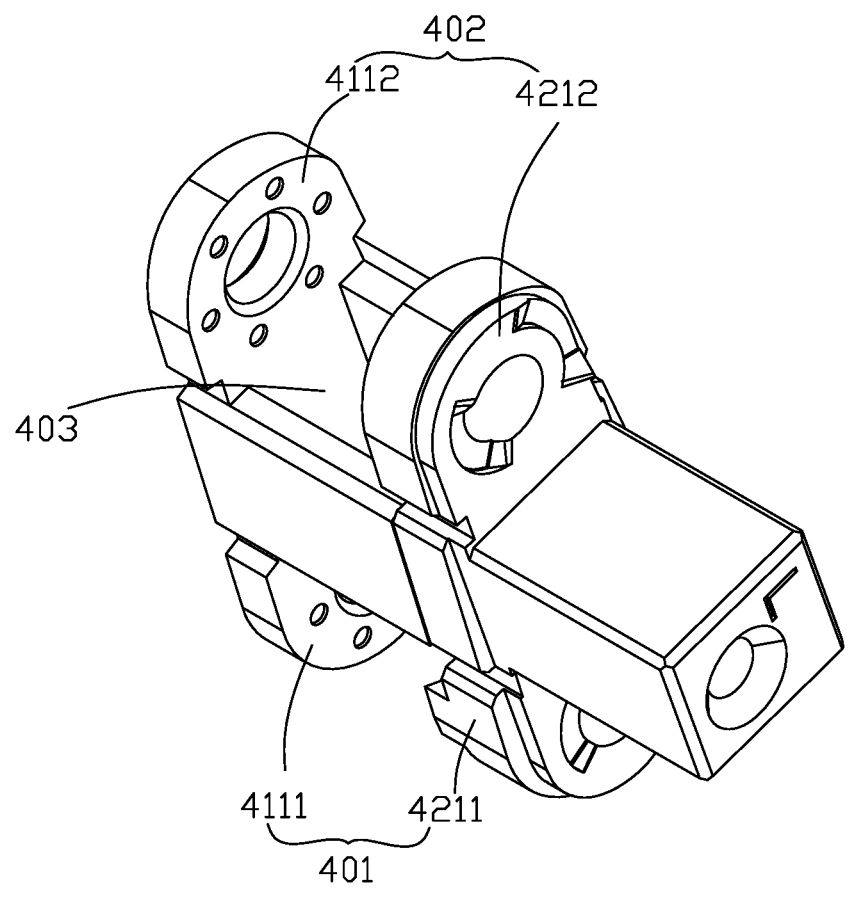
FIG. 6 is a structural diagram of a holding assembly in FIG. 2.
Figure 7:
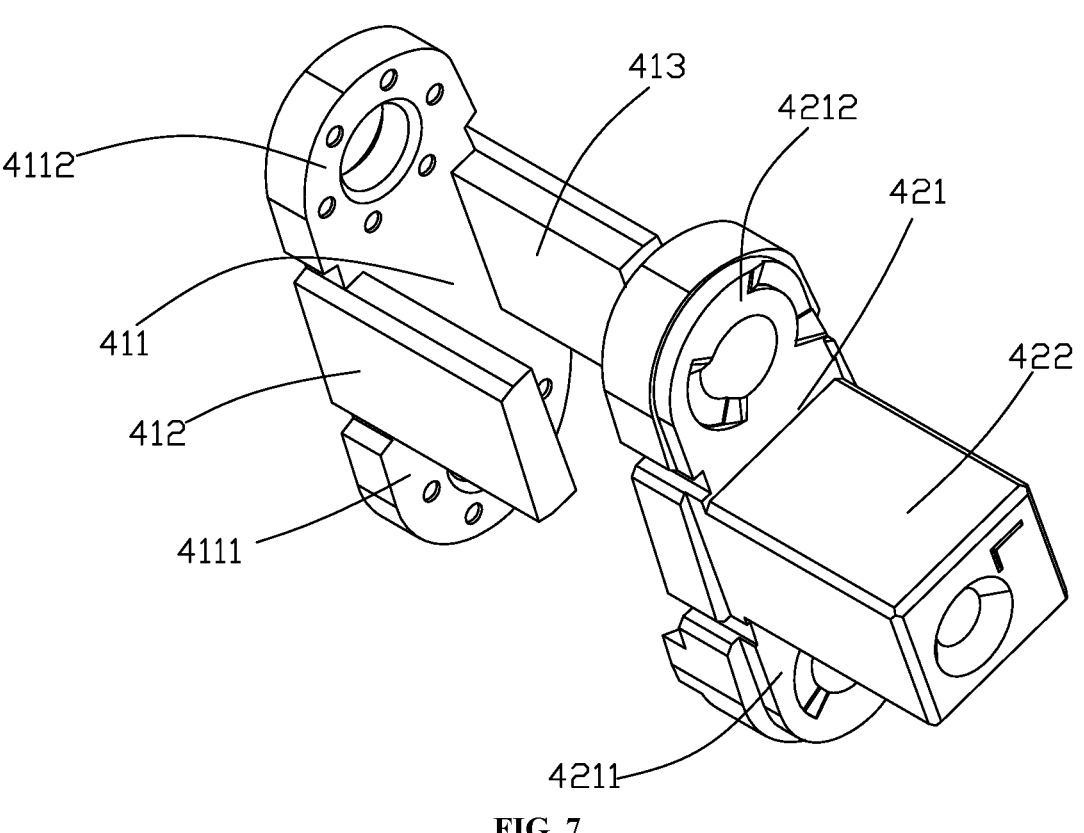
FIG. 7 is an exploded view of the holding assembly in FIG. 6.

The holding assembly 40 is not only used to maintain the parallel arrangement state between the first shaft 11 and the second shaft 21, but also used to limit the degree of freedom of the first wheel 12 and the second wheel 22 in the first direction. Referring to FIG. 6 and FIG. 7. The holding assembly 40 includes a first installation part 401, a second installation part 402, and a guide space 403. The first installation part 401 may be used for passing through the first shaft 11, the second installation part 402 may be used for passing through the second shaft 21, and the guide space 403 may be used for guiding the stopper 30 to move along the first direction.

More specifically, the holding assembly 40 includes a first holding part 41 and an oppositely arranged second holding part 42. The first holding part 41 includes a first holding body 411. The two ends of the first holding body 411 respectively include a first piercing part 4111 and a third piercing part 4112, and a first extension 412 and a second extension 413 respectively extend from two sides of the first holding body 411. The second holding part 42 includes a second holding assembly 421. Two ends of the second holding assembly 421 respectively include a second piercing part 4211 and a fourth piercing part 4212. The second holding assembly 421 is arranged opposite to the first holding body 411 and there is a gap between the second holding assembly 421 and the first holding body 411. The second piercing part 4211 is arranged opposite to the first piercing part 4111 such that the second piercing part 4211 and the first piercing part 4111 jointly form the first installation part 401. The fourth piercing part 4212 is arranged opposite to the third piercing part 4112 such that the fourth piercing part 4212 and the third piercing part 4112 jointly form the second installation part 402. Both the first extension 412 and the second extension 413 extend toward the direction of the second holding assembly 421 to form a holding beam. In this way, the structure of the holding assembly 40 can be stable, and by setting the first extension 412 and the second extension 413 facing each other, there are two holding beams. The two holding beams together with the first holding body 411 and the second holding assembly 421 enclose a limited space, and the limited space forms the guide space 403.

In some embodiments, in order to position the holding assembly 40, an extension 422 is arranged to extend away from the guide space 403 on the side of the second holding assembly 421 facing away from the guide space 403. When the rotation structure 300 is applied to an electronic device, by fixing the extension 422 to a specific position in the housing of the electronic device, the holding assembly 40 can be positioned correctly, thereby achieving the purpose of maintaining the parallel arrangement state between the first shaft 11 and the second shaft 21.

Figure 3:
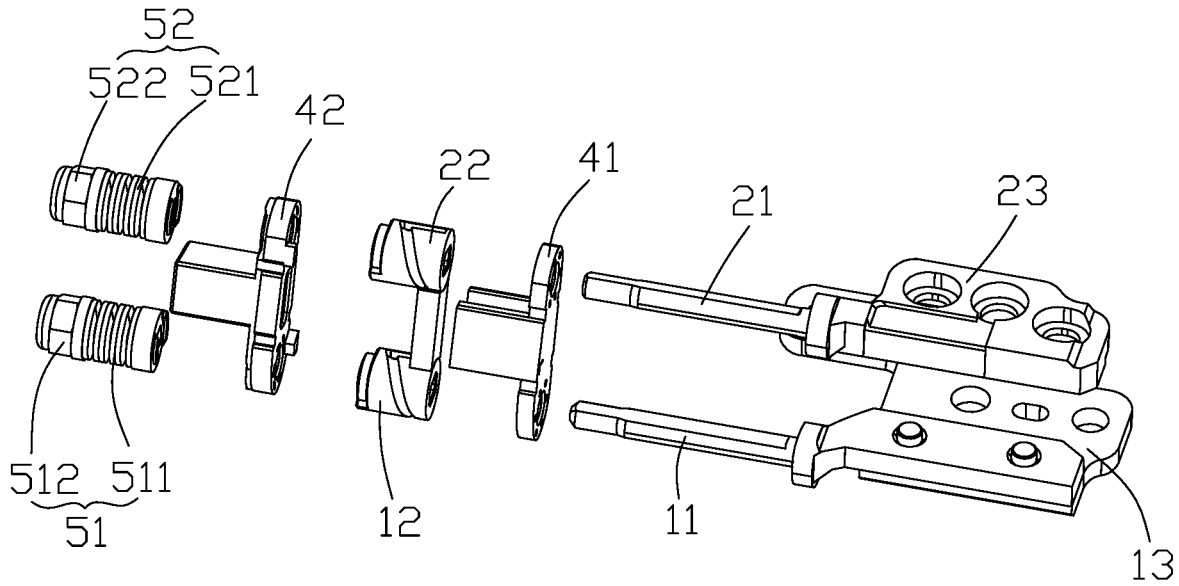
FIG. 3 is an exploded view of the rotation structure according to an embodiment of the present disclosure.

Referring to FIG. 3. The torsion assembly 50 includes a first torsion structure 51 and a second torsion structure 52. The first torsion structure 51 includes a first torsion spring 511 and a first nut 512. The first torsion spring 511 is mounted on the first shaft 11 and abuts against the side of the second piercing part 4211 facing away from the guide space 403, and the first nut 512 is installed on the first shaft 11. By tightening the first torsion spring 511 by screwing the first nut 512, the first torsion spring 511 can provide an appropriate and adjustable torque. The second torsion structure 52 includes a second torsion spring 521 and a second nut 522. The second torsion spring 521 is installed on the second shaft 21 and abuts against the side of the fourth piercing part 4212 facing away from the guide space 403, and the second nut 522 is installed on the second shaft 21. By tightening the second torsion spring 521 by screwing the second nut 522, the second torsion spring 521 can provide an appropriate and adjustable torque.

The torsion assembly 50 is not limited to the combination of torsion springs and nuts. The torsion assembly 50 can be any structure as long as it can provide torque and maintain the parallel arrangement state between the first shaft 11 and the second shaft 21.

Referring to FIG. 2, FIG. 4, FIG. 5, FIG. 8, and FIG. 9, in the rotation structure 300 of an embodiment of the present disclosure, the first shaft 11 and the second shaft 21 may rotate alternately. Take an electronic device with a rotation cycle of 360° as an example. From 0° to 360°, during the rotation process of the stopper 30, the cooperation between the first shaft 11 and the second shaft 21 and the opening and closing states of the electronic device may be as follows.

1. As shown in FIG. 2 and FIG. 4, FIG. 4 being a partial structural diagram of the state of FIG. 2. At the initial 0° state, the stopper 30 is at the first position, the first protrusion 31 is limited to the first linear groove segment 1211, and the second protrusion 32 is limited in the second spiral groove segment 2211. At the initial 0° state, the first shaft 11 is in a locked state, the rotation structure 300 can rotate around the second shaft 21, and the angle between the first body 100 and the second body 200 is 0°. That is, the electronic device is in a buckled state.

2. Rotate to a specified angle (such as 180°) when the rotation structure 300 is at the initial 0° state. In the process of rotating from 0° to 180°, the second protrusion 32 moves along the second spiral groove segment 2211, and drives the stopper 30 to move to the left, thereby moving from the first position to the second position along the first direction (as shown in FIG. 8, in order to clearly reflect the position of the stopper 30, the first holding part 41 is hidden in FIG. 8). During this process, the first protrusion 31 moves along the first linear groove segment 1211, which restricts the rotational movement of the first shaft 11, such that the first shaft 11 is locked and the second shaft 21 rotates. The first body 100 of the electronic device remains stationary under the action of the first connector 13, and the second body 200 rotates 180° under the action of the second connector 23. Take the electronic device as a notebook computer, the screen end is rotated 180° relative to the keyboard end, such that the screen end is opened to a position of 180° relative to the keyboard end.

3. Referring to FIG. 4 and FIG. 8, when the 180° position is reached, the second protrusion 32 reaches the intersection position between the second spiral groove segment 2211 and the second linear groove segment 2212, limiting the rotation of the second shaft 21; the first protrusion 31 reaches the intersection position between the first linear groove segment 1211 and the first spiral groove segment 1212, and no longer restricts the rotation of the first shaft 11, such that the first shaft 11 can rotate freely. Here, the intersection position of the second spiral groove segment 2211 and the second linear groove segment 2212, and the interaction position of the first linear groove segment 1211 and the first spiral groove segment 1212 actually constitute the rotation mode position switching of the rotation structure 300.

Figure 9:
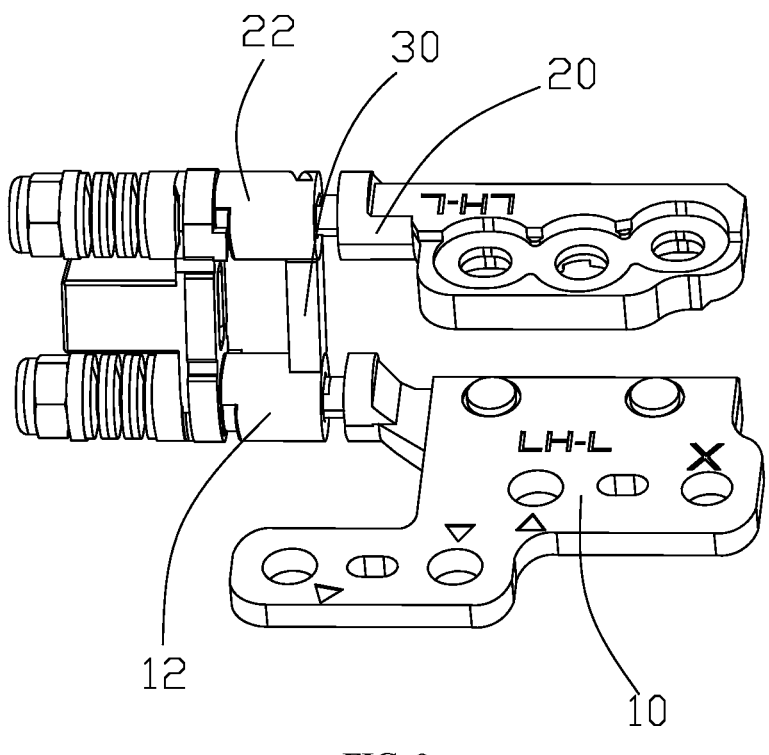
FIG. 9 is a third schematic diagram of the rotation structure according to an embodiment of the present disclosure.

4. Continue rotation, such as from 180° to 360°. During this process, the first protrusion 31 moves along the first spiral groove segment 1212, and drives the stopper 30 to move to the right, thereby moving form the second position to the first position along the first direction (as shown in FIG. 9, in order to clearly reflect the position of the stopper 30, the first holding part 41 is hidden in FIG. 9). During this process, the second protrusion 32 moves along the second linear groove segment 2212, restricting the rotational movement of the second shaft 21, such that the second shaft 21 is locked and the first shaft 11 rotates. The second body 200 of the electronic device remains stationary under the action of the second connector 23, and the first body 100 rotates 180° under the action of the first connector 13. When applied to a notebook computer, the keyboard end opens to 180° relative to the screen end, and continues to open 180°, such that the screen end opens to a 360° position relative to the keyboard end. When the 360° is reached, the second protrusion 32 reaches the end position of the second linear groove segment 2212. The end position of the second linear groove segment 2212 refers to a position away from the intersection with the second spiral groove segment 2211. Further, the first protrusion 31 reaches the end of the first spiral groove segment 1212. The end position of the first spiral groove segment 1212 refers to a position away from the intersection with the first linear groove segment 1211, thereby completing a rotation cycle.

The process from 360° to 0° is completely opposite to the movement process described above, which realizes the reverse rotation of the rotation structure 300.

It should be understood that the above angular position is an example. In practical applications, the angle distribution of the intersection position, the spiral groove segment trajectory, and the linear groove segment trajectory in the first groove 121, and the angle distribution of the spiral groove segment trajectory and the linear groove segment trajectory in the second groove 221 can be adjusted based on actual needs. However, the rotation mode and switching principle are substantially the same, which will not be repeated here.

Consistent with the present disclosure, alternate locking and rotation of the first shaft 11 and the second shaft 21 can be realized through the limiting of the first protrusion 31 by the first groove 121 and the limiting of the second protrusion 32 by the second groove 221. However, practical applications are not limited thereto. In some embodiments, the limit of the first groove 121 to the first protrusion 31 and the limit of the second groove 221 to the second protrusion 32 may enable the rotation structure 300 to be in a second rotation mode. In the second rotation mode, the first shaft 11 and the second shaft 21 may rotate simultaneously, such that the mixing of the rotation structure 300 can be realized. That is, the first shaft 11 and second shaft 21 can not only rotate asynchronously, but also rotate simultaneously.

Figure 10:
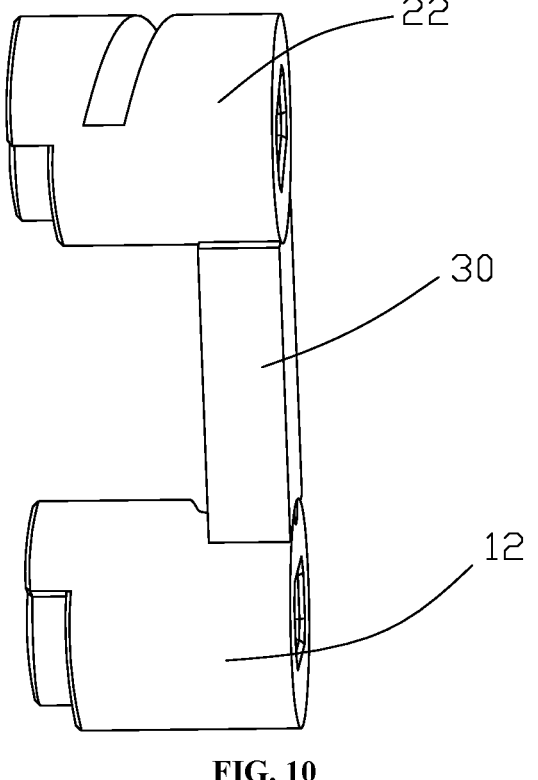
FIG. 10 is a first connection structure diagram of the first wheel, the second wheel, and the stopper of the rotation structure according to another embodiment of the present disclosure.
Figure 11:
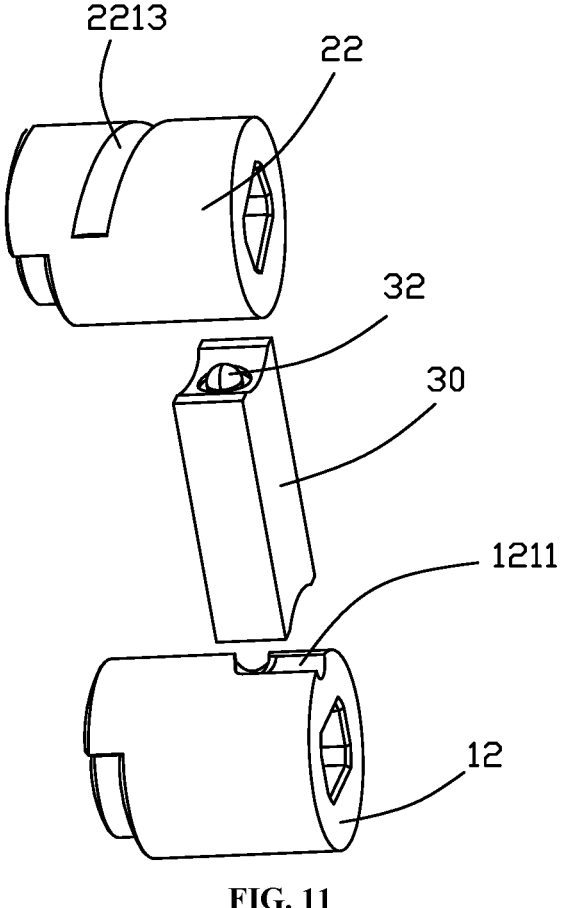
FIG. 11 is a first exploded view of the structure in FIG. 10.
Figure 12:
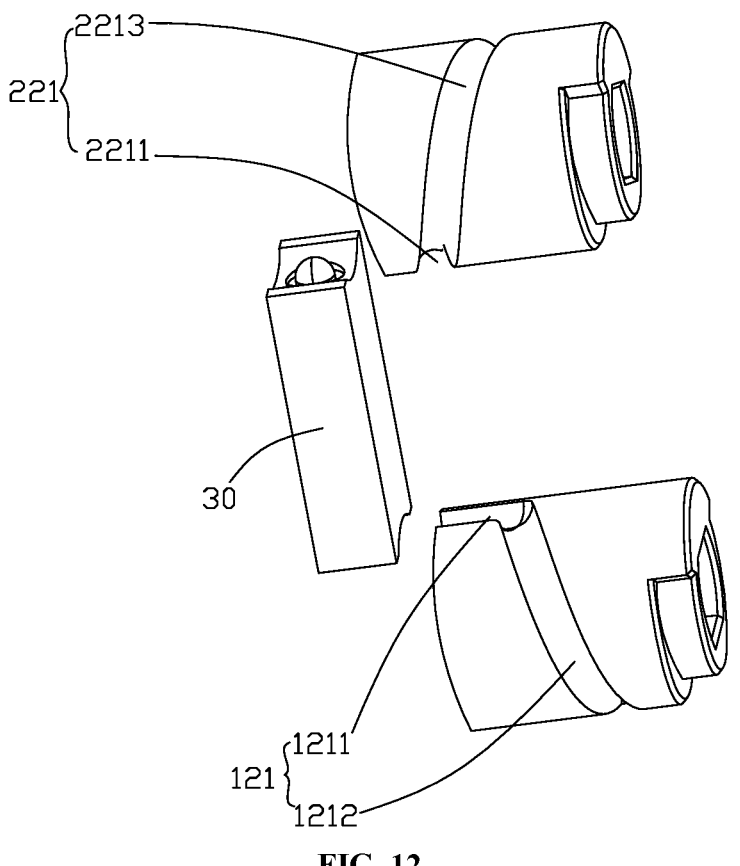
FIG. 12 is a second exploded view of the structure in FIG. 10.
Figure 13:
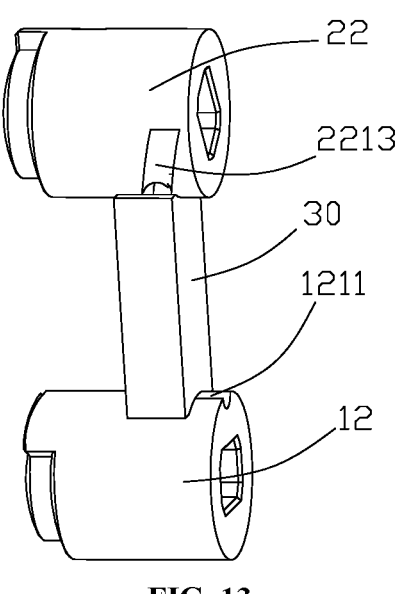
FIG. 13 is a second connection structure diagram of the first wheel, the second wheel, and the stopper of the rotation structure according to another embodiment of the present disclosure.
Figure 14:
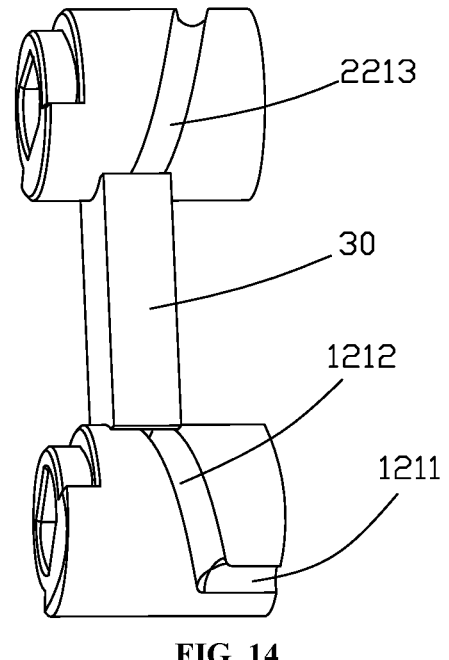
FIG. 14 is a third connection structure diagram of the first wheel, the second wheel, and the stopper of the rotation structure according to another embodiment of the present disclosure.

Referring to FIG. 10 to FIG. 14, in another embodiment of the present disclosure, the rotation of the rotation structure 300 may be mixed. In this embodiment, the first groove 121 includes the first linear groove segment 1211 and the first spiral groove segment 1212, and the first spiral groove segment 1212 communicates with the first linear groove segment 1211. The second groove 221 includes the second spiral groove segment 2211 and the third spiral groove segment 2213. The second spiral groove segment 2211 corresponds to the first linear groove segment 1211, and the third spiral groove segment 2213 communicates with the second spiral groove segment 2211. When the first protrusion 31 is limited to move in the first linear groove segment 1211, the second protrusion 32 may be limited to move in the second spiral groove segment 2211, such that the stopper 30 moves from the first position (as shown in FIG. 10, the stopper 30 is in the first position at this time) to the second position (as shown in FIG. 13, the stopper 30 is in the second position at this time) along the first direction. In the first position, the first shaft 11 is locked and the second shaft 21 rotates, and in the second position, the first shaft 11 and the second shaft 21 can rotate simultaneously. When the first protrusion 31 is limited to move in the first spiral groove segment 1212, the second protrusion 32 may be limited to move in the third spiral groove segment 2213 to move the stopper 30 from the second position to a third position (as shown in FIG. 14, the stopper 30 is in the third position at this time) along the first direction, and to rotate the first shaft 11 and the first wheel 12 simultaneously.

Referring to FIG. 10, FIG. 13, and FIG. 14, in the rotation structure 300 of an embodiment of the present disclosure, not only one of the first shaft 11 and the second shaft 21 may rotate, but both may rotate at the same time, that is, the first shaft 11 and the second shaft 21 may rotate asynchronously and synchronously. Take an electronic device with a rotation cycle of 360° as an example. From 0° to 360°, during the rotation process of the stopper 30, the cooperation between the first shaft 11 and the second shaft 21 and the opening and closing states of the electronic device may be as follows.

1. Referring to FIG. 10, FIG. 11, and FIG. 12, at the initial 0° state, the stopper is at the first position, the first protrusion 31 is limited in the first linear groove segment 1211, and the second protrusion 32 is limited in the second spiral groove segment 2211. At the initial 0° state, the first shaft 11 is in a locked state, the rotation structure 300 can rotate around the second shaft 21, and the angle between the first body 100 and the second body 200 is 0°. That is, the electronic device is in a buckled state.

2. Rotate to a specified angle (such as 77°) when the rotation structure 300 is at the initial 0° state (as shown in FIG. 10). In the process of rotating from 0° to 77°, the second protrusion 32 moves along the second spiral groove segment 2211, and drives the stopper 30 to move to the left, thereby moving from the first position to the second position (as shown in FIG. 13) along the first direction. In the process of rotating from 0° to 77°, the first protrusion 31 moves along the first linear groove segment 1211, which restricts the rotational movement of the first shaft 11. The first shaft 11 is locked, and the second shaft 21 rotates. The first body 100 of the electronic device remains stationary under the action of the first connector 13, and the second body 200 rotates 77° under the action of the second connector 23. When applied to a notebook computer, the screen end is rotated 77° relative to the keyboard end, such that the screen end is opened to a position of 77° relative to the keyboard end.

3. Referring to FIG. 11, FIG. 12, and FIG. 13, when the 77° position is reached, the second protrusion 32 reaches the intersection position between the second spiral groove segment 2211 and the third spiral groove segment 2213, the second shaft 21 is still unrestricted and can continue to rotate. When the first protrusion 31 reaches the intersection position between the first linear groove segment 1211 and the first spiral groove segment 1212, the first protrusion 31 no longer restricts the rotation of the first shaft 11, such that the first shaft 11 can also rotate freely. Here, the intersection position of the second spiral groove segment 2211 and the third spiral groove segment 2213, and the intersection position of the first linear groove segment 1211 and the first spiral groove segment 1212 actually constitutes the switching position of the rotation mode of the rotation structure 300.

4. Continue to rotate to the specified angle. During this process, the first protrusion 31 moves along the first spiral groove segment 1212, which drives the stopper 30 to move to the left, thereby moving from the second position to the third position along the first direction (as shown in FIG. 14). Further, the second protrusion 32 moves along the third spiral groove segment 2213, and the second shaft 21 and the first shaft 11 rotate simultaneously. The second body 200 of the electronic device is rotated by a specified angle under the action of the second connector 23, and the first body 100 is simultaneously rotated by a specified angle under the action of the first connector 13. When applied to a notebook computer, the keyboard end continues to rotate twice the specified angle relative to the screen end, such that the screen end continues to open to a position of 77° relative to the keyboard end, such as opening to a 360° position. When the 360° position is reached, the second protrusion 32 reaches the end position of the third spiral groove segment 2213. The end position of the third spiral groove segment 2213 may refer to the position away from the intersection position with the second spiral groove segment 2211. In addition, the first protrusion 31 reaches the end position of the first spiral groove segment 1212. The end position of the first spiral groove segment 1212 may refer to the position away from the intersection position with the first linear groove segment, thereby completing a rotation cycle.

The process from 360° to 0° is completely opposite to the movement process described above, which realizes the reverse rotation of the rotation structure 300.

It should be understood that the above angular position is an example. In practical applications, the angle distribution of the intersection position, the spiral groove segment trajectory, and the linear groove segment trajectory in the first groove 121, and the angle distribution of the spiral groove segment trajectory and the linear groove segment trajectory in the second groove 221 can be adjusted based on actual needs. However, the rotation mode and switching principle are substantially the same, which will not be repeated here.

In addition, in the rotation structure of the embodiment shown in FIG. 10 to FIG. 14, for the structure of the stopper 30, the holding assembly 40, and the torsion assembly 50, reference can be made to the structure in the embodiment shown in FIG. 2 to FIG. 9, which will not be repeated here.

In the embodiments of the present disclosure, the structure of the first groove 121 is not limited to the foregoing embodiments, and the structure of the second groove 221 is not limited to the foregoing embodiments.

Referring to FIG. 15 to FIG. 19, in one embodiment of the present disclosure, the rotation structure 300 includes a first rotating shaft assembly 10, a second rotating shaft assembly 20, a stopper 30, a holding assembly 40, and a torsion assembly 50 (the torsion assembly 50 is not shown in FIG. 15 to FIG. 19, and the specific structure of the torsion assembly 50, reference can be made to FIG. 13).

The first rotating shaft assembly 10 includes a first shaft 11 and a first wheel 12 arranged on the first shaft 11. The first wheel 12 is arranged on the first groove 121 to conveniently connect with the first body 100. One end of the first shaft 11 is also connected with the first connector 13. Through the first connector 13, the fixed connection between the first shaft 11 and the first body 100 can be realized. The second rotating shaft assembly 20 includes a second shaft 21 and a second wheel 22 arranged on the second shaft 21. The second shaft 21 and the first shaft 11 may be arranged side by side at intervals, and the second shaft 21 and the first shaft 11 may be arranged to meet a parallel condition. The parallel condition here may be that the second shaft 21 and the first shaft 11 are parallel to each other within a tolerance range, and the arrangement state can be maintained by the holding assembly 40 and the torsion assembly 50. A second groove 221 is arranged on the second wheel 22 to conveniently connect with the second body 200. One end of the second shaft 21 is also connected with a second connector 23. Both the first shaft 11 and the second shaft 21 may rotate around their own axes. Asynchronous rotation can be realized through the mutual cooperation between the first wheel 12, the second wheel 22, and the stopper 30, such that when the rotation structure 300 is applied to a notebook computer, the screen end and the keyboard end of the notebook computer can be opened and closed between 0° to 360°, and can stay at any opening and closing angle stably. The two ends of the torsion assembly 50 may be respectively connected to the first shaft 11 and the second shaft 21. Through the torsion assembly 50, the rotation structure 300 may stay at any opening and closing angle within the range of opening and closing angles, and stably maintain the stopped state.

Figure 16:
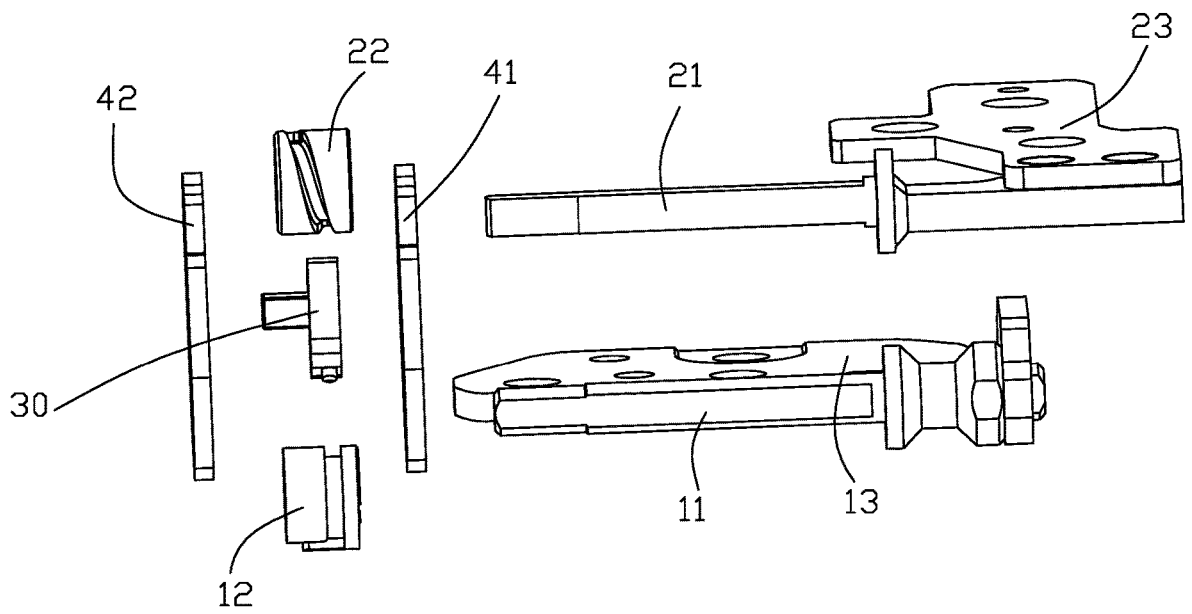
FIG. 16 is an exploded view of the rotation structure according to another embodiment of the present disclosure.
Figure 19:
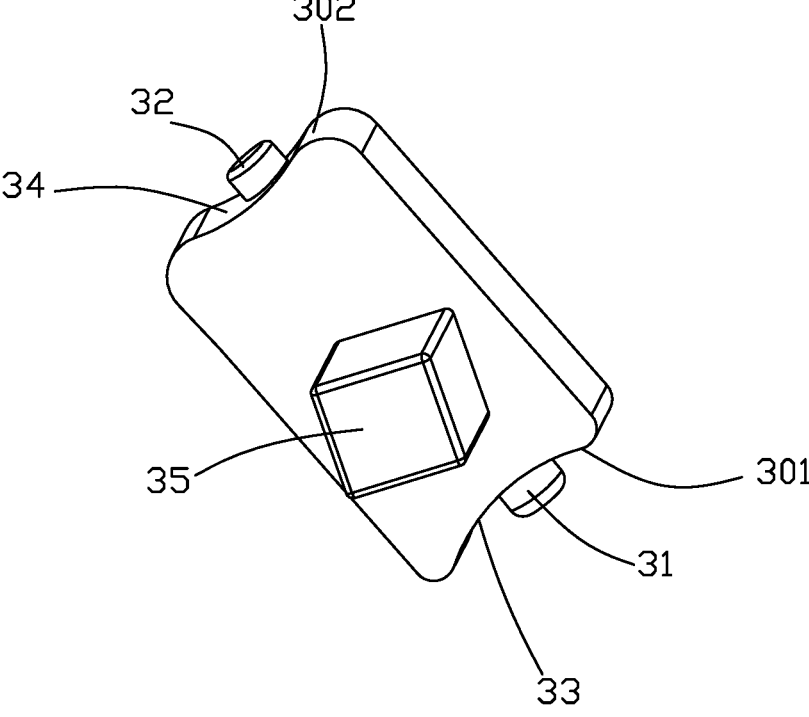
FIG. 19 is a structural diagram of the stopper in FIG. 16.

Referring to FIG. 16 and FIG. 19, the stopper 30 includes a first protrusion 31 and a second protrusion 32. The first protrusion 31 may be limited to move in the first groove 121, and the second protrusion 32 may be limited to move in the second groove 221. The limit of the first groove 121 to the first protrusion 31 and the limit of the second groove 221 to the second protrusion 32 enable the rotation structure 300 to be at least in the first rotation mode. In the first rotation mode, one of the first shaft 11 and the first wheel 12 can rotate.

More specifically, in order to limit the movement of the first protrusion 31 in the first groove 121 and the movement of the second protrusion 32 in the second groove 221, the stopper 30 may include a first end 301 and an oppositely arranged second end 302. The stopper 30 may include a first arc-shaped groove 33 on the first end 301 and a second arc-shaped groove 34 on the second end 302. At least part of the first wheel 12 may be accommodated in the first arc-shaped groove 33, at least part of the second wheel 22 may be accommodated in the second arc-shaped groove 34, the first protrusion 31 may be disposed on the first arc-shaped groove 33, and the second protrusion 32 may be disposed on the second arc-shaped groove 34. In this way, not only can the movement of the first protrusion 31 be limited within the first groove 121, and the movement of the second protrusion 32 can be limited within the second groove 221 conveniently, but the stopper 30 can also be prevented from interfering with the first wheel 12 and/or the second wheel 22 during the movement.

Figure 17:
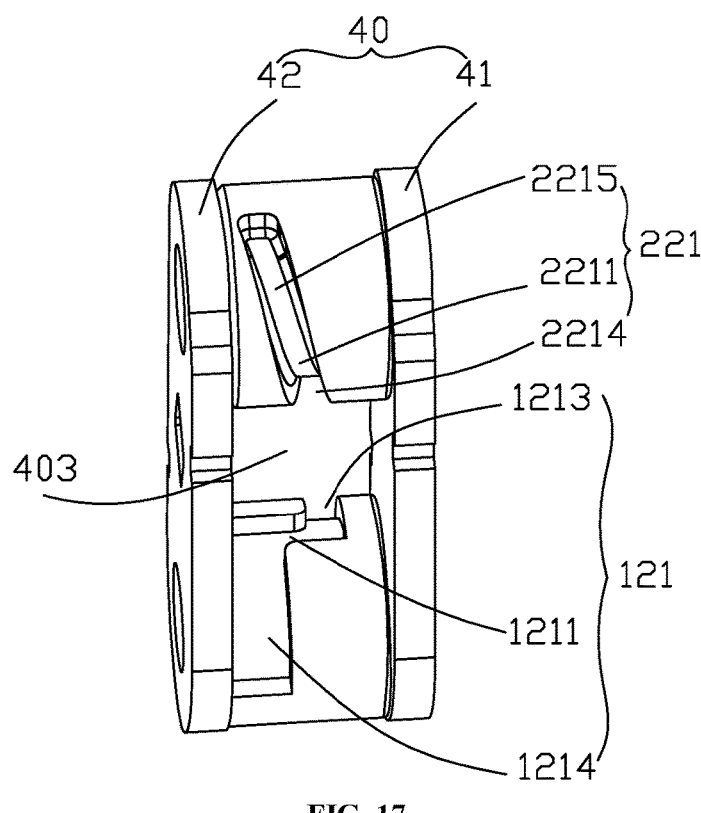
FIG. 17 is a connection structure diagram of the first wheel, the second wheel, and the holding assembly in FIG. 16.
Figure 20:
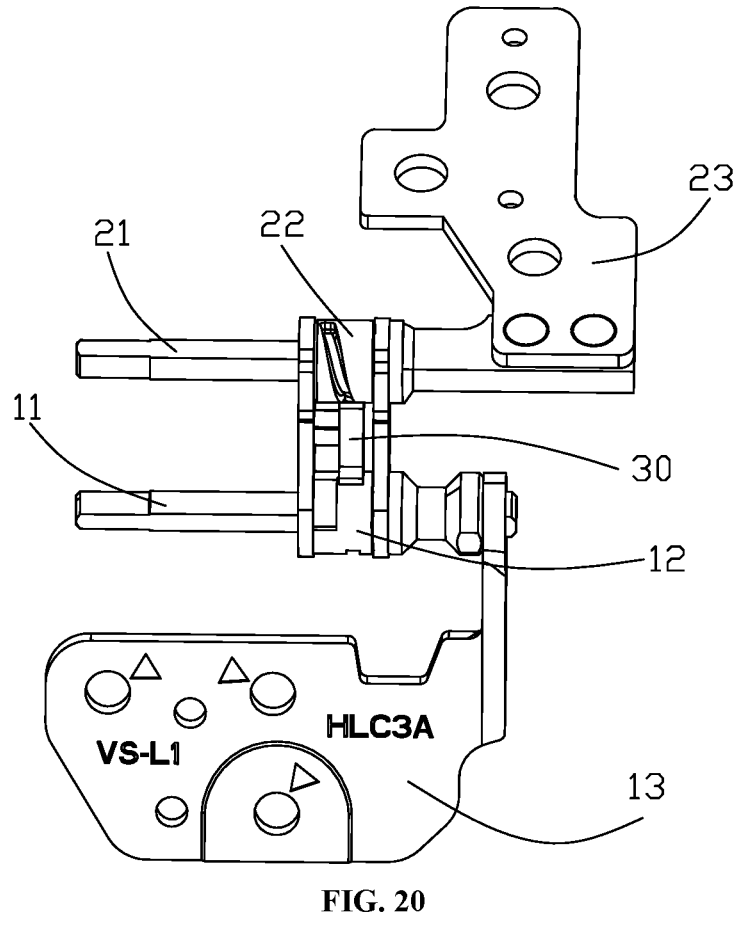
FIG. 20 is a second schematic diagram of the rotation structure according to another embodiment of the present disclosure.
Figure 21:
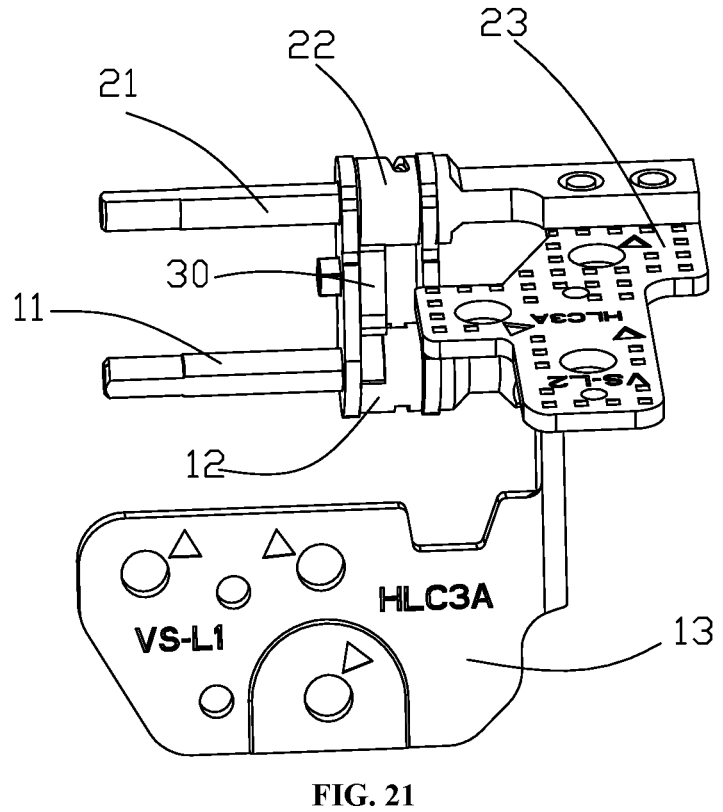
FIG. 21 is a third schematic diagram of the rotation structure according to another embodiment of the present disclosure.

Referring to FIG. 17, the first groove 121 includes a first linear groove segment 1211 and a first circumferential groove segment 1213, and the first circumferential groove segment 1213 communicates with the first linear groove segment 1211. The second groove 221 includes a second spiral groove segment 2211 and a fourth spiral groove segment 2214. The second spiral groove segment 2211 corresponds to the first linear groove segment 1211, and the fourth spiral groove segment 2214 communicates with the second spiral groove segment 2211. When the first protrusion 31 is limited to move in the first linear groove segment 1211, the second protrusion 32 may be limited to move in the second spiral groove segment 2211, such that the stopper 30 moves from the first position (as shown in FIG. 20, the stopper 30 is in the first position at this time) to the second position (as shown in FIG. 21, the stopper 30 is in the second position at this time) along the first direction. During the movement of the stopper 30 from the first position (as shown in FIG. 20, the stopper 30 is at the first position at this time) to the second position along the first direction, the first shaft 11 is locked and the second shaft 21 rotates, where the first direction meets the parallel condition with the first shaft 11 or the second shaft 21. When the first protrusion 31 is limited to move in the first circumferential groove segment 1213, the second protrusion 32 may be limited to move the in the fourth spiral groove segment 2214, the stopper 30 may be restricted to move, and at the same time, the rotation of the second shaft 21 may be restricted. When the stopper moves to the first position, movement switching may be performed, and when the stopper 30 moves to the second position, movement switching may also be performed. The first position and the second position are the positions where the rotation mode of the rotation structure 300 is switched., and the specific switching mode will be described later. In this way, through the cooperation of the first linear groove segment 1211 and the second spiral groove segment 2211 on the stopper 30, the asynchronous movement of the rotation structure 300 can be realized. Further, through the cooperation of the first circumferential groove segment 1213 and the fourth spiral groove segment 2214 on the stopper 30, the asynchronous movement of the rotation structure 300 can also be realized.

In some embodiments, the first spiral groove segment 1212 may also include a second circumferential groove segment 1214 communicating with the first linear groove segment 1211. The second circumferential groove segment 1214 and the first circumferential groove segment 1213 may be respectively connected to both ends of the first linear groove segment 1211. The second groove 221 may also include a fifth spiral groove segment 2215 communicating with the second spiral groove segment 2211, and the fourth spiral groove segment 2214 and the fifth spiral groove segment 2215 may be respectively connected to the two ends of the second spiral groove segment 2211. When the first protrusion 31 is limited to move in the second circumferential groove segment 1214, the second protrusion 32 may be restricted to move in the fifth spiral groove segment 2215, the stopper 30 may be restricted to move, and at the same time, the rotation of the first shaft 11 may rotate, and the second shaft 21 may be restricted to rotate. In this way, through the cooperation of the second circumferential groove segment 1214 and the fifth spiral groove segment 2215 on the stopper the asynchronous movement of the rotation structure 300 can also be realized.

Figure 18:
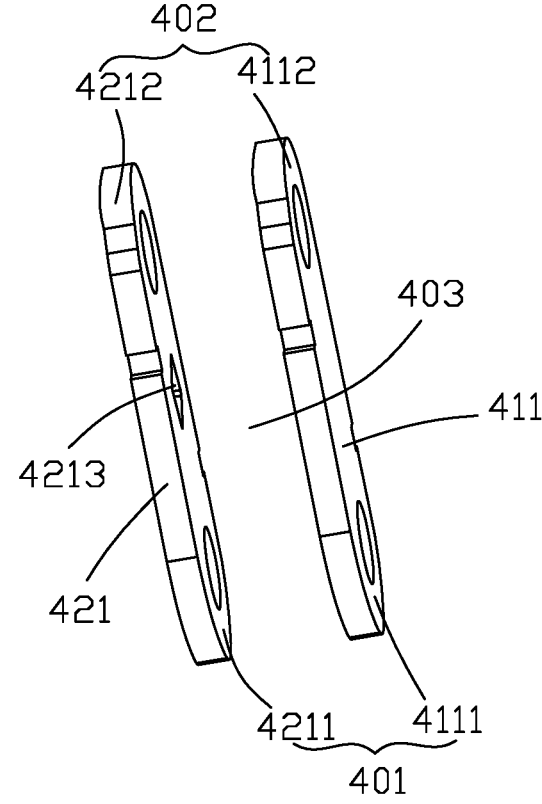
FIG. 18 is a structural diagram of the holding assembly in FIG. 16.

Referring to FIG. 17 and FIG. 18, in this embodiment, the holding assembly includes a first installation part 401, a second installation part 402, and a guide space 403. The first installation part 401 may be used for passing through the first shaft 11, the second installation part 402 may be used for passing through the second shaft 21, and the guide space 403 may be used for guiding the stopper 30 to move along the first direction. More specifically, the holding assembly 40 includes a first holding part 41 and a second holding part 42. The first holding part 41 includes a first holding body 411, the two ends of the first holding body 411 respectively include a first piercing part 4111 and a third piercing part 4112. The second holding part 42 includes a second holding assembly 421, and the two ends of the second holding assembly 421 respectively include a second piercing part 4211 and a fourth piercing part 4212. The second holding assembly 421 is opposite to the first holding body 411. There is a space between the second holding assembly 421 and the first holding body 411, and the space forms a guide space 403. The second piercing part 4211 is opposite to the first holding body 411 such that the second piercing part 4211 and the first piercing part 4111 jointly form the first installation part 401. The fourth piercing part 4212 is opposite to the third piercing part 4112 such that the fourth piercing part 4212 and the third piercing part 4112 jointly form the second installation part 402. The first wheel 12 and the second wheel 22 are both sandwiched between the first holding part 41 and the second holding part 42, thereby maintaining the parallel arrangement state between the first shaft 11 and the first wheel 12, and limiting the degree of freedom of the first wheel 12 and the second wheel 22 in the first direction.

In order to guide the stopper 30, a through hole may be opened on the second holding assembly 421. A guide 35 may extend from the side of the stopper 30 opposite to the second holding assembly 421. Guide 35 may be a columnar structure, and guide 35 of the columnar structure may correspond to the through hole. During the movement of the stopper from the first position along the first direction to the second position, the guide 35 may be inserted into the through hole and may move along the first direction in the through hole, thereby further guiding the stopper 30.

Referring to FIG. 15, FIG. 19, FIG. 20, FIG. 21, and FIG. 22, in the rotation structure 300 of this embodiment, the first shaft 11 and the second shaft 21 may rotate alternately. Take a rotation cycle of an electronic device as 360° as an example. From 0° to 360°, during the rotation process of the rotation structure 300, the rotation of the first shaft 11 and the first wheel 12, and the opening and closing states of the electronic device are as follows.

Figure 15:
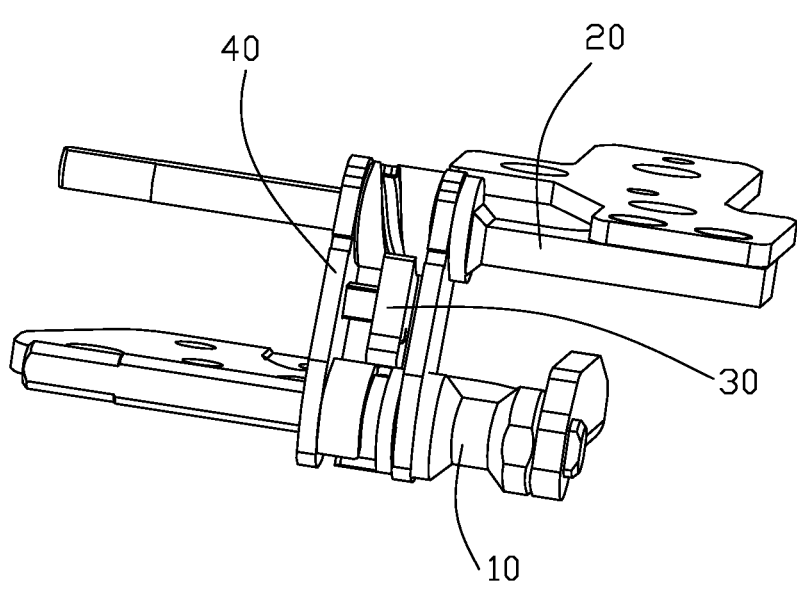
FIG. 15 is a first schematic diagram of the rotation structure according to another embodiment of the present disclosure.

1. As shown in FIG. 15. At the initial 0° state, the stopper 30 is at the first position. The first protrusion 31 is limited in the first circumferential groove segment 1213, and the second protrusion 32 is limited in the fourth spiral groove segment 2214. At the initial 0° position, the fourth spiral groove segment 2214 restricts the stopper 30 from moving left and right, such that the second shaft 21 cannot rotate, and the rotation structure 300 can rotate around the first shaft 11. At this time, the angle between the first body 100 and the second body 200 is at 0°, that is, the electronic device is in a buckled state.
2. Rotate to a specified angle (such as 115°) when the rotation structure 300 is at the initial 0° state. In the process of rotating from 0° to 115°, the first protrusion 31 moves along the first circumferential groove segment 1213, the spiral structure of the fourth spiral groove segment 2214 restricts the second protrusion 32, and the movement of the stopper 30 is restricted, thereby restricting the rotational movement of the second shaft 21, the second shaft 21 is locked, and the first shaft 11 rotates. The first body 100 of the electronic device rotates 115° under the action of the first connector 13, and the second body 200 remains stationary under the action of the second connector 23. When applied to a notebook computer, the screen end is rotated 115° relative to the keyboard end, such that the screen end is opened to a position 115° relative to the keyboard end.

3. Referring to FIG. 20, when the position of 115° is reached, the second protrusion 32 reaches the intersection position between the second spiral groove segment 2211 and the fourth spiral groove segment 2214, and the first protrusion 31 reaches the intersection position between the first linear groove segment 1211 and the first circumferential groove segment 1213. At this time, the stopper 30 is still at the first position, but the first shaft 11 has stopped rotating, and at the same time, the first linear groove segment 1211 releases the left and right degrees of freedom of the first protrusion 31, and the second shaft 21 can start to rotate. Here, the intersection position of the second spiral groove segment 2211 and the fourth spiral groove segment 2214, and the intersection position of the first linear groove segment 1211 and the first circumferential groove segment 1213 actually constitute a switching position of the rotation mode of the rotation structure 300.
4. Continue to rotate to the specified angle, such as rotating from 115° to 280°. At this time, the second protrusion 32 moves along the second spiral groove segment 2211, and drives the stopper 30 to move to the left, thereby moving from the first position to the second position (as shown in FIG. 21, the stopper 30 is in the second position at this time) along the first direction. During the rotation from 115° to 280°, the first protrusion 31 moves along the first linear groove segment 1211, which restricts the rotational movement of the first shaft 11. The first shaft 11 is locked, and the second shaft 21 can rotate. The first body 100 of the electronic device remains stationary under the action of the first connector 13, and the second body 200 rotates 165° under the action of the second connector 23. When applied to a notebook computer, the screen side opens to 115° relative to the keyboard end and continues to open 165° such that the screen end opens to 280° relative to the keyboard end.
5. Referring to FIG. 21, when 280° is reached, the second protrusion 32 reaches the intersection position of the second spiral groove segment 2211 and the fifth spiral groove segment 2215, the first protrusion 31 reaches the intersection position of the first linear groove segment 1211 and the second circumferential groove segment 1214, and the second shaft 21 stops rotating. Here, the intersection position of the second spiral groove segment 2211 and the fifth spiral groove segment 2215, and the intersection position of the first linear groove segment 1211 and the second circumferential groove segment 1214 actually constitute another switching position of the rotation mode of the rotation structure 300.

Figure 22:
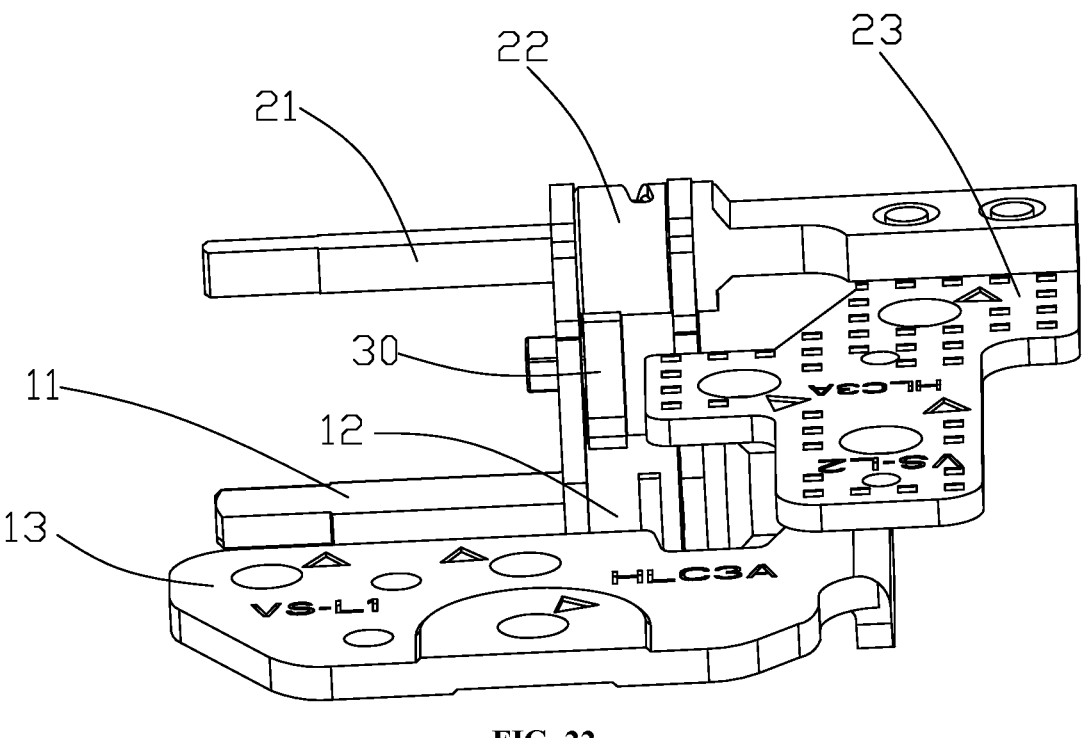
FIG. 22 is a fourth schematic diagram of the rotation structure according to another embodiment of the present disclosure.

6. Continue to rotate to the specified angle, such as rotating from 280° to 360°. At this time, the first protrusion 31 moves along the second circumferential groove segment 1214, the spiral structure of the fifth spiral groove segment 2215 restricts the second protrusion 32, and the stopper 30 is restricted from moving, thereby restricting the rotational movement of the second shaft 21. During the rotation from 280° to 360°, the second shaft 21 is locked and the first shaft 11 rotates. The first body 100 of the electronic device is rotated by 80° under the action of the first connector 13, and the second body 200 remains stationary under the action of the second connector 23. When applied to a notebook computer, the screen end opens to 280° relative to the keyboard end and continues to open 80° such that the screen end opens to 360° relative to the keyboard end (as shown in FIG. 22), thereby completing a rotation cycle.

The process from 360° to 0° is completely opposite to the movement process described above, which realizes the reverse rotation of the rotation structure 300.

It should be understood that the above angular positions are examples. In practical applications, the intersection positions, the angular distribution of the spiral groove segments in the first groove 121 and the two circumferential groove segments, and the angular distribution of the three spiral groove segments in the second groove 221 can be adjusted based on actual needs. However, the rotation mode and switching principle are substantially the same, which will not be repeated here.

Consistent with the present disclosure, the rotation structure adopts the combination of the wheel grooves and protrusions. Instead of radial movement, axial movement can be used to realize biaxial blocking and release during asynchronous movement. The contact plane between the protrusions and the wheel grooves keeps sliding on the same circumferential surface during rotation without curvature change, which improves the stop-and-go feeling when switching.

In addition, by changing the matching relationship between the spiral grooves and the linear grooves of the wheels, the combination design of synchronous and asynchronous movement of a single module can be realized, which enriches the switching modes and applications scenarios.

In the description of the present disclosure, the orientation or positional relationship indicated by the orientation words refers to the orientation or positional relationship shown in the drawings, is to facilitate the description of the present disclosure and to simplify the description. Unless stated to the contrary, these directional words do not indicate or imply that the device or element must have a particular orientation or be constructed and operated in a particular orientation and are not to limit the protection scope of the present disclosure. The directional words "inner" and "outer" refer to the inside and outside relative to the contour of each component itself.

For the ease of description, spatially relative terms, such as "on", "over", "on top of", "above", may be used to describe the spatial positional relationship of one or more components or features in the drawings relative to other components or features. Spatially relative terms encompass not only the orientation of components as depicted in the figures, but also different orientations involved in use or operations. For example, if a component in the figures is turned upside down in its entirety, components "above" or "above other components or features" would include components "below" or "below other components or features".

Thus, the term "above" can encompass both an orientation of "above" and an orientation "below." In addition, these components or features may also be oriented at other different angles (for example, rotated 90 degrees or other angles), all of which are intended to be encompassed herein.

The terminology used herein is for the purpose of describing specific embodiments only, and is not intended to limit the embodiments according to the present disclosure. As used herein, unless the context clearly dictates otherwise, the singular is intended to include the plural as well, furthermore, it is to be understood that when the terms "comprising" and/or "including" are used in the present disclosure, the terms refer to features, steps, operations, parts, components and/or combinations thereof.

Terms such as "first" and "second" in the description and claims of the present disclosure and the above drawings are used to distinguish similar objects, and are not necessarily used to describe a specific sequence or sequence. Data so used may be interchanged under appropriate circumstances so that the embodiments of the disclosure described herein can also be practiced in sequences other than those illustrated or described herein.

The present disclosure has been described according to the above-described embodiments, but the above-described embodiments are only for the purpose of illustration and description, and are not intended to limit the present disclosure to the scope of the described embodiments. In addition, those skilled in the art can understand that the present disclosure is not limited to the above-mentioned embodiments, and variations and modifications can be made according to the teachings of the present disclosure, which all fall within the protection claimed in the present disclosure. The scope of protection of the present disclosure is defined by the appended claims and their equivalents.

What is claimed is:

1. A rotation structure comprising:
a first rotating shaft assembly configured to connect to a first body of an electronic device;
a second rotating shaft assembly configured to connect to a second body of the electronic device; and
a stopper, wherein:
the first rotating shaft assembly includes a first shaft and a first wheel arranged on the first shaft, a first groove being arranged on the first wheel;
the second rotating shaft assembly includes a second shaft and a second wheel arranged on the second shaft, the second shaft and the first shaft satisfying a parallel condition, a second groove being arranged on the second wheel;
a first protrusion and a second protrusion are arranged on the stopper, the first protrusion being limited to move in the first groove, the second protrusion being limited to move in the second groove;
the limit of the first groove to the first protrusion and the limit of the second groove to the second protrusion allow one of the first shaft and the second shaft to rotate;
the first groove includes a first linear groove segment and a first spiral groove segment communicating with the first linear groove segment, the second groove includes a second linear groove segment and a second spiral groove segment communicating with the second linear groove segment, the first linear groove segment and the second linear groove segment extend along a first direction, and the first direction is parallel to the first shaft or the second shaft;

when the first body is rotated relative to the second body from 0° to a specific angle, the first protrusion is limited to move in the first linear groove segment, and the second protrusion is limited to move in the second spiral groove segment, to lock the first shaft and rotate the second shaft;

when the first body is rotated relative to the second body from the specific angle to 360°, the first protrusion is limited to move in the first spiral groove segment, and the second protrusion is limited to move in the second linear groove segment, to rotate the first shaft and lock the second shaft; and the specific angle is an angle between 0° and 360°.

2. The rotation structure of claim 1, wherein:

the second groove further includes a third spiral groove segment communicating with the second spiral groove segment.

3. The rotation structure of claim 1, wherein:

the first groove further includes a first circumferential groove segment communicating with the first linear groove segment, the second groove further includes a fourth spiral groove segment communicating with the second spiral groove segment, and when the first protrusion is limited to move in the first circumferential groove segment, the second protrusion is limited to move in the fourth spiral groove segment to limit the stopper from moving.

4. The rotation structure of claim 3, wherein:

the first groove further includes a second circumferential groove segment communicating with the first linear groove segment, the second groove further includes a fifth spiral groove segment communicating with the second spiral groove segment, and when the first protrusion is limited to move in the second circumferential groove segment, the second protrusion is limited to move in the fifth spiral groove segment to limit the stopper from moving.

5. The rotation structure of claim 1, wherein:

one of the first shaft and the second shaft rotates is a first rotation mode, the limit of the first groove to the first protrusion and the limit of the second groove to the second protrusion cause the rotation structure to be in a second rotation mode, under the second rotation mode, the first shaft and the second shaft rotate simultaneously.

6. The rotation structure of claim 1, wherein:

the stopper includes a first end, a second end arranged oppositely from the first end, a first arc-shaped groove arranged on the first end, and a second arc-shaped groove arranged on the second end, at least part of the first wheel being accommodated in the first arc-shaped groove, at least part of the second wheel being accommodated in the second arc-shaped groove, the first protrusion being arranged on the first arc-shaped groove, the second protrusion being arranged on the second arc-shaped groove.

7. The rotation structure of claim 1, further comprising:

a holding assembly, the holding assembly being arranged to limit degree of freedom of the first wheel and the second wheel in the first direction, wherein the holding assembly includes:

a first installation part, the first installation part being configured for the first shaft to pass through;

a second installation part, the second installation part being configured for the second shaft to pass through; and a guide space to guide the stopper to move along the first direction.

8. An electronic device comprising:

a first body;

a second body; and a rotation structure connecting the first body and the second body for the first body and the second body to open and close mutually, the rotation structure including:

a first rotating shaft assembly;

a second rotating shaft assembly; and a stopper, wherein:

the first rotating shaft assembly includes a first shaft and a first wheel arranged on the first shaft, a first groove being arranged on the first wheel;

the second rotating shaft assembly includes a second shaft and a second wheel arranged on the second shaft, the second shaft and the first shaft satisfying a parallel condition, a second groove being arranged on the second wheel;

a first protrusion and a second protrusion are arranged on the stopper, the first protrusion being limited to move in the first groove, the second protrusion being limited to move in the second groove;

the limit of the first groove to the first protrusion and the limit of the second groove to the second protrusion allow one of the first shaft and the second shaft to rotate;

the first groove includes a first linear groove segment and a first spiral groove segment communicating with the first linear groove segment, the second groove includes a second linear groove segment and a second spiral groove segment communicating with the second linear groove segment, the first linear groove segment and the second linear groove segment extend along a first direction, and the first direction is parallel to the first shaft or the second shaft;

when the first body is rotated relative to the second body from 0° to a specific angle, the first protrusion is limited to move in the first linear groove segment, and the second protrusion is limited to move in the second spiral groove segment, to lock the first shaft and rotate the second shaft;

when the first body is rotated relative to the second body from the specific angle to 360°, the first protrusion is limited to move in the first spiral groove segment, and the second protrusion is limited to move in the second linear groove segment, to rotate the first shaft and lock the second shaft; and the specific angle is an angle between 0° and 360°.

9. The electronic device of claim 8, wherein:

the second groove further includes a third spiral groove segment communicating with the second spiral groove segment.

10. The electronic device of claim 8, wherein:

the first groove further includes a first circumferential groove segment communicating with the first linear groove segment, the second groove further includes a fourth spiral groove segment communicating with the second spiral groove segment, and when the first protrusion is limited to move in the first circumferential groove segment, the second protrusion is limited to move in the fourth spiral groove segment to limit the stopper from moving.

11. The electronic device of claim 10, wherein:

the first groove further includes a second circumferential groove segment communicating with the first linear groove segment, the second groove further includes a fifth spiral groove segment communicating with the second spiral groove segment, and when the first protrusion is limited to move in the second circumferential groove segment, the second protrusion is limited to move in the fifth spiral groove segment to limit the stopper from moving.

12. The electronic device of claim 8, wherein:

one of the first shaft and the second shaft rotates is a first rotation mode, the limit of the first groove to the first protrusion and the limit of the second groove to the second protrusion cause the rotation structure to be in a second rotation mode, under the second rotation mode, the first shaft and the second shaft rotate simultaneously.

13. The electronic device of claim 8, wherein:

the stopper includes a first end, a second end arranged oppositely from the first end, a first arc-shaped groove arranged on the first end, and a second arc-shaped groove arranged on the second end, at least part of the first wheel being accommodated in the first arc-shaped groove, at least part of the second wheel being accommodated in the second arc-shaped groove, the first protrusion being arranged on the first arc-shaped groove, the second protrusion being arranged on the second arc-shaped groove.

14. The electronic device of claim 8, wherein the rotation structure further includes:

a holding assembly, the holding assembly being arranged to limit degree of freedom of the first wheel and the second wheel in the first direction, wherein the holding assembly includes:

a first installation part, the first installation part being configured for the first shaft to pass through;

a second installation part, the second installation part being configured for the second shaft to pass through; and a guide space to guide the stopper to move along the first direction.

15. A rotation structure comprising:

a first rotating shaft assembly configured to connect to a first body of an electronic device;

a second rotating shaft assembly configured to connect to a second body of the electronic device; and a stopper, wherein:

the first rotating shaft assembly includes a first shaft and a first wheel arranged on the first shaft, a first groove being arranged on the first wheel;

the second rotating shaft assembly includes a second shaft and a second wheel arranged on the second shaft, the second shaft and the first shaft satisfying a parallel condition, a second groove being arranged on the second wheel;

a first protrusion and a second protrusion are arranged on the stopper, the first protrusion being limited to move in the first groove, the second protrusion being limited to move in the second groove;

the limit of the first groove to the first protrusion and the limit of the second groove to the second protrusion allow one of the first shaft and the second shaft to rotate;

the first groove includes a first linear groove segment and a first spiral groove segment communicating with the first linear groove segment, the second groove includes a second linear groove segment and a second spiral groove segment communicating with the second linear groove segment;

when the first body is rotated relative to the second body from 0° to a specific angle, the first protrusion is limited to move in the first linear groove segment, and the second protrusion is limited to move in the second spiral groove segment, to lock the first shaft and rotate the second shaft;

when the first body is rotated relative to the second body from the specific angle to 360°, the first protrusion is limited to move in the first spiral groove segment, and the second protrusion is limited to move in the second linear groove segment, to rotate the first shaft and lock the second shaft;

the specific angle is an angle between 0° and 360°; and two ends of the first spiral groove segment are at different distances to a side, along an axial direction, of the first wheel, and two ends of the second spiral groove segment are at different distances to a side, along an axial direction, of the second wheel.

* * * * *